United States Patent Office 3,350,429
Patented Oct. 31, 1967

3,350,429
PROCESS FOR THE MANUFACTURE OF MODIFIED CLAYS
Hiroshi Hasegawa, Hyogo-ken, Eiji Suito, Sakyoku, Kyoto, and Mitsuji Kondo, Usuigun, Gumma-ken, Japan, assignors to Shiraishi Kogyo Kaisha, Ltd., Hyogo-ken, Japan
No Drawing. Filed Apr. 30, 1962, Ser. No. 191,325
Claims priority, application Japan, June 1, 1961, 36/19,555
4 Claims. (Cl. 260—404)

The present invention relates to modified clay obtainable by adding to montmorillonite clay such as bentonite, a complex produced from higher fatty amine and a nonionic higher organic polar compound, and to a process for the manufacture thereof, more particularly relates to modified clay of which hydrocarbon chain of molecules of the complex extends perpendicularly to a basal plane (001) between the clay structural sheets, and to a process for the manufacture thereof.

In the reaction between montmorillonite and an organic compound, there is an ionic reaction involving the so-called base exchange wherein an inorganic cation of the clay is substituted by an organic cation and also a nonionic reaction wherein hydrated water of clay is substituted by an organic polar compound although the reaction is not followed by said base exchange. If the organic cation or a nonionic organic polar compound is made to react with montmorillonite, these organic molecules penetrate into and between the montmorillonite sheets, and the basal plane spacings of montmorillonite become wider. The width of these basal plane spacings depends upon the kind of organic compound and the quantity of the organic compound added to clay. Generally speaking, it is widely known that organic molecules lie between the montmorillonite sheets and extend parallel to the basal plane.

The present invention involves the manufacture of modified clay wherein the hydrocarbon chain of said organic complex molecule has been made to extend perpendicularly to the base plane between the montmorillonite sheets by adding to the montmorillonite a complex produced from a higher fatty amine belonging to classes from the primary to the tertiary (excepting the quaternary ammonium salt) and a nonionic higher organic polar compound.

In order to obtain such modified clay wherein the hydrocarbon chain of the organic complex molecule has been made to extend perpendicularly to the basal plane, the quaternary ammonium salt cannot be used instead of the higher fatty amine belonging to the primary through the tertiary classes, which is used in the present invention. For example, in the modified clay obtainable by adding to bentonite a complex produced from trimethyloctadecyl ammonium chloride and tallow fatty amide, the hydrocarbon chain of said organic complex molecule will not be situated perpendicularly to the basal plane between the clay structural sheets. It is well known that in modified clay obtainable by adding octadecyl amine acetate alone to bentonite, the hydrocarbon chain of amine is situated vertically to the basal plane, but this is limited to a case where the quantity of amine added to bentonite greatly exceeds the base exchange capacity of the clay. The industrial utilization value of amine in such an excessive quantity is very poor, because it decreases the ability to produce gel in an organic solvent using the modified clay.

According to tests, the results of measuring by X-ray diffraction the spatial structure of modified clay obtained by adding octadecyl amine alone and a complex produced from octadecyl amine and stearamide to bentonite for various ratios are as follows:

OCTADECYL AMINE PLUS BENTONITE

| Quantity of amine added to 100 grs. bentonite (milliequivalents) | 0 | 25 | 40 | 50 | 60 | 75 | 100 | 125 | 150 | 175 |
|---|---|---|---|---|---|---|---|---|---|---|
| Basal plane (001) spacings (A.) | 9.8 | 13.0 | 13.4 | 16.6 | 17.8 | 17.8 | 17.8 | 30.6 | 32.6 | 31.6 |
| Separation of the structural sheets (A.) | 0 | 3.2 | 3.6 | 6.8 | 8.0 | 8.0 | 8.0 | 20.8 | 22.8 | 21.8 |
| State of arrangement of hydrocarbon chain to basal plane | | (1) | (1) | (2) | (2) | (2) | (2) | (3) | (3) | (3) |

[1] Parallel 1 molecular layer.   [2] Parallel 2 molecular layers.   [3] Vertical 1 molecular layer.

COMPLEX OF OCTADECYL AMINE AND STEARAMIDE (1:1 MOL. RATIO) PLUS BENTONITE

| Quantity of amine added to 100 grs. bentonite (milliequivalents) | 0 | 25 | 40 | 50 | 60 | 75 | 100 | 125 | 150 | 175 |
|---|---|---|---|---|---|---|---|---|---|---|
| Basal plane (001) spacings (A.) | 9.8 | 13.0 | 14.0 | 31.6 | 31.6 | 31.6 | 31.6 | 31.6 | 32.6 | 31.6 |
| Separation of the structural sheets (A.) | 0 | 3.2 | 4.2 | 21.8 | 21.8 | 21.8 | 21.8 | 21.8 | 22.8 | 21.8 |
| State of arrangement of hydrocarbon chain to basal plane | | (1) | (1) | (2) | (2) | (2) | (2) | (2) | (2) | (2) |

[1] Parallel 1 molecular layer.   [2] Vertical 1 molecular layer.

It can be known that a hydrocarbon chain is arranged perpendicularly to the basal plane by the fact that the separation of the structural sheets agrees with the length of the corresponding hydrocarbon chain. The calculated value of the chain length of octadecyl radical is 21.25 A.

In case of amine alone, hydrocarbon chain is directed perpendicularly to the basal plane by addition of amine of 125 milliequivalents which is more than the base exchange capacity of bentonite (about 100 milliequivalents/100 grs.), but in the case of a complex, the hydrocarbon chain can be oriented perpendicularly to the basal plane by the addition of a quantity of complex of only 50 milliequivalents. Therefore, the present invention relates to modified clay comprising a chain hydrocarbon radical formed of organic complex molecules which is directed perpendicularly to the basal plane (001) between the clay structural sheets. The modified clay is produced by adding to montmorillonite clay a complex obtained from 1 mol. of a higher fatty amine belonging to a class from the primary through the tertiary classes and having more than 1 chain hydrocarbon radical comprising more than 10 carbon atoms, and 1 mol of a nonionic higher organic polar compound having more than 1 chain hydrocarbon radical comprising more than 10 carbon atoms, and also relates to a process for the manufacture thereof.

According to the present invention, if a complex of higher fatty amine and nonionic higher organic polar compound is added to clay, it is possible to make the hydrocarbon chain of the organic complex molecules extend perpendicularly to the basal plane between the clay structural sheets by adding a quantity of the complex which is somewhat smaller or slightly more than the quantity of amine added in case amine alone is added.

The points of advantage of the present invention are as follows:

Firstly, as a result of hydrocarbon chain of organic complex molecules being directed perpendicularly to the basal plane, separation of the strucurtal sheets of clay is extremely large. Because of this, the forces of adhesion between the clay structural sheets become weak, and consequently it is extremely easy to crush dry cake. For example, dry cake of modified clay obtained by adding 100 milliequivalents/100 grs. of the complex of octadecyl amine-stearamide (1:1 mol. ratio) can be pulverized by grinding it with the fingertip, while dry cake of heretofore known modified clay, for example, modified clay obtained by adding a complex of trimethyloctadecyl ammonium chloride-tallow fatty amide to bentonite forms a fairly hard aggregated lump, and therefore it needs a much greater grinding force to obtain pulverization of the lumps.

Secondly, in case amine alone is added, the hydrocarbon chain cannot become oriented perpendicularly to the basal plane unless amine in a quantity which greatly exceeds the base exchange capacity of the clay is added. The gel forming properties of modified clay in an organic solvent are greatest when the quantity of amine is chemically equivalent to the base exchange capacity of clay, and if a greater amount of amine is added, the gel forming properties are impaired. Where modified clay according to the present invention is concerned, it is satisfactory to add a quantity of amine which is less, when a complex is added, than the quantity of amine added in case amine alone is added and because of this, impairment of the gel forming properties due to excess amine are avoided.

All types of montmorillonite clays such as bentonite, Japanese acid clay, hectorite, nontronite, etc. can be used as inorganic materials for practicing the present invention.

As a complex which reacts on the clay and which is capable of producing a hydrocarbon chain extending perpendicularly to the basal plane between the clay structural sheets, there may be used any complex produced by the combining of any of the higher fatty amines belonging to classes from the primary through the tertiary classes such as dodecyl amine, octadecyl amine, methyloctadecyl amine, dioctadecyl amine and dimethyloctadecyl amine; amide such as stearamide and palmitamide; alcohol such as dodecyl alcohol and cetyl alcohol; nitrile such as stearonitrile and palmitonitrile; ester such as methylstearate, ethylpalmitate and polyoxyethylene monostearate; and ether such as polyoxyethylene lauryl ether and polyoxyethylene stearyl ether with any nonionic higher organic polar compound similar thereto at the mol. ratio of 1:1.

In order to produce a complex used for the purpose of practicing the present invention, it is possible either to make a higher fatty amine salt of a water soluble acid such as acetic acid, hydrochloric acid, sulfuric acid, phosphoric acid and formic acid, and then mix said salt of water soluble acid with a nonionic higher organic polar compound after melting, or to mix higher fatty amine with a nonionic higher organic polar compound and then add the aforesaid acid thereto. As the process for adding a complex to clay, it suffices to make the complex and a dispersion of the clay in water, separately, and to add the complex as an emulsion to the clay dispersion while the latter is undergoing agitation.

The present invention is illustrated by the following examples.

*Example 1*

100 grs. of purified bentonite was dispersed in 5 l. of water. On the other hand, a complex was produced by heating and melting 0.1 mol. of octadecyl amine acetate and 0.1 mol. of stearamide, and said complex was emulsified by making it disperse in 1 l. of water. The complex emulsion was added to the aqueous bentonite suspension while agitating the latter. The product was dried and ground after it had been subjected to suction filtration.

The product was dried by preserving it in a vacuum desiccator for 12 hours, and then its spatial structure was measured by using a Geiger-Müller counter X-ray spectrometer and the results were as follows:

A.
Basal plane (001) spacings _____ 31.6
Separation of the structural sheets _____ 21.8

Thus, a modified clay comprising a hydrocarbon chain of organic complex molecules was made, the chain extending perpendicularly to the basal plane.

On the other hand, modified clay was produced by using 0.1 mol. of trimethyloctadecyl ammonium chloride instead of the aforesaid octadecyl amine without changing all other ratios. The spatial structure of the modified clay was as follows:

A.
Basal plane (001) spacings _____ 20.1
Separation of the structural sheets _____ 10.3

This clay comprised a hydrocarbon chain of organic compound molecules extending parallel to the basal plane.

*Example 2*

The same operation as that in Example 1 was made by using 0.1 mol. of stearonitrile instead of stearamide as in Example 1. The spatial structure of the modified clay thus obtained was just the same as the structure of the modified clay obtained by using a complex of octadecyl amine-stearamide.

*Example 3*

A complex emulsion comprising 29.6 grs. of completely hydrogenated rapeseed fatty amine (average molecular weight 296), 26.3 grs. of stearamide, 6 grs. of acetic acid and 1 l. of water was added to 3340 grs. of 2% aqueous bentonite suspension while the latter was being agitated violently. Since the reaction product precipitated immediately, the upper clear liquid was decanted and thrown away, and then the precipitate was dried and ground after being subjected to suction filtration. The spatial structure of the product was as follows:

A.
Basal plane (001) spacings _____ 38.0
Separation of the structural sheets _____ 28.2

The product was a modified clay comprising a hydrocarbon chain of organic complex molecules extending perpendicularly to the basal plane. Moreover, the separation of the structural sheets was extremely large. This was due to the $C_{22}H_{45}NH_2$ molecules contained in the fully hydrogenated rapeseed fatty amine.

What we claim is:

1. The method for producing a modified montmorillonite clay in which a chain hydrocarbon radical of organic complex molecules extends perpendicularly to the basal plane (001) between the clay structural sheets, said method comprising the steps of adding to montmorillonite clay a complex which is produced by melting and mixing 1 mol. of higher fatty amine together with 1 mol. of a member of the group consisting of higher fatty amide and higher fatty nitrile; adding to the mixture with 1 mol. of the group consisting of acetic acid and a complex which is produced by melting and mixing 1 mol. of higher fatty amine acetate together with 1 mol. of higher fatty amide or higher fatty nitrile, said chain having from 12 to 22 carbon atoms.

2. The method according to claim 1, wherein said higher fatty amine is selected from the group consisting of octadecyl amine and completely hydrogenated rapeseed fatty amine.

3. The method according to claim 1, wherein said higher fatty amide is selected from the group consisting of stearamide and stearonitrile.

4. A process for the manufacture of modified clay in which a dispersion of a complex which is produced by melting and mixing 1 mol. of higher fatty amine together with 1 mol. of higher fatty amide or higher fatty nitrile and then adding to the mixture with 1 mol. of acetic acid, or a complex which is produced by melting and mixing 1 mol. of higher fatty amine acetate together with 1 mol. of higher fatty amide or higher fatty nitrile is added with an aqueous montmorillonite clay dispersion and the product thus obtained is filtrated and dried.

References Cited

UNITED STATES PATENTS 2,531,427  11/1950  Hauser _____ 260—448
2,883,357  4/1959  Hardy _____ 260—448

OTHER REFERENCES

Jordan et al.: Journal of Physical and Colloid Chemistry, pp. 1196–1208 (1950).

CHARLES B. PARKER, *Primary Examiner.*

A. H. WINKELSTEIN, A. LOUIS MONACELL,

*Examiners.*

I. R. PELLMAN, R. V. HINES, *Assistant Examiners.*